United States Patent
Menegoli

[19]

[11] Patent Number: 6,163,120
[45] Date of Patent: Dec. 19, 2000

[54] SIMPLE BACK EMF RECONSTRUCTION IN PULSE WIDTH MODULATION (PWM) MODE

[75] Inventor: Paolo Menegoli, San Jose, Calif.

[73] Assignee: STMicroelectronics, Inc., Carrollton, Tex.

[21] Appl. No.: 09/520,297

[22] Filed: Mar. 7, 2000

Related U.S. Application Data

[63] Continuation of application No. 09/098,913, Jun. 17, 1998, abandoned, which is a continuation-in-part of application No. 08/767,715, Dec. 17, 1996, abandoned.

[51] Int. Cl.[7] .................................. G05B 5/01; H02P 5/40
[52] U.S. Cl. ......................... 318/254; 318/138; 318/439; 318/590
[58] Field of Search ...................... 318/138, 139, 318/254, 245, 280–290, 439, 560–590, 591, 432, 433; 327/112, 108, 423, 584, 111, 421, 483, 230, 365, 227; 331/11, 25

[56] References Cited

U.S. PATENT DOCUMENTS

| | | | |
|---|---|---|---|
| 5,319,290 | 6/1994 | Yoshino et al. | 318/254 |
| 5,367,234 | 11/1994 | DiTucci | 318/254 |
| 5,397,967 | 3/1995 | Carobolante et al. | 318/254 |
| 5,399,953 | 3/1995 | Yoshino | 318/799 |
| 5,469,096 | 11/1995 | Nessi et al. | 327/112 |
| 5,541,484 | 7/1996 | DiTucci | 318/254 |
| 5,614,797 | 3/1997 | Carobolante | 318/432 |
| 5,631,588 | 5/1997 | Bertolini | 327/108 |
| 5,838,128 | 11/1998 | Maiocchi et al. | 318/439 |
| 5,869,946 | 2/1999 | Carobolante | 318/811 |
| 5,909,095 | 6/1999 | Sakti et al. | 318/254 |
| 5,952,889 | 9/1999 | Duffossez | 331/11 |
| 6,043,619 | 3/2000 | Gleim | 318/254 |

*Primary Examiner*—Paul Ip
*Attorney, Agent, or Firm*—Theodore E. Galanthay; Lisa K. Jorgenson; Robert D. McCutcheon

[57] ABSTRACT

A circuit and method for reconstructing the back emf of a floating coil of a polyphase dc motor in PWM mode is provided. The floating coil is coupled to a first capacitor through a floating phase switch that closes during a pulse produced by the PWM drive signaling the appropriate time to sample in the PWM cycle. The signal on the floating coil is sampled and the sampled signal is stored using a capacitor. After the sampling period, the stored signal is discharged (or charged) at a rate that substantially models the slew rate or slope rate of the expected back emf signal at or near the zero crossing of the back emf signal with the common tap signal. The voltage across the capacitor is a reconstruction of the actual back emf and is generated using samples of the back emf. The reconstructed back emf is compared to the center tap voltage to more accurately detect the zero crossing.

47 Claims, 5 Drawing Sheets

6,163,120

SIMPLE BACK EMF RECONSTRUCTION IN PULSE WIDTH MODULATION (PWM) MODE

CROSS-REFERENCE TO RELATED APPLICATIONS

This application is a continuation of application Ser. No. 09/098,913, filed Jun. 17, 1998, now abandoned, which is a continuation-in-part of application Ser. No. 08/767,715, filed Dec. 17, 1996, now abandoned.

TECHNICAL FIELD

The present invention relates to improvements in motor driving and controlling circuitry, and is more specifically related to an improved circuit and method for back electromotive force (emf) detection in a polyphase direct current (dc) motor, or the like.

BACKGROUND

Three phase dc motors, particularly brushless, sensorless, three phase dc motors, are popular in drives in information retrieval systems that use rotating recording media, such as discs. Conventional disc drives are used to both record and to retrieve information. As discs become more prevalent as the medium of choice for storing information in both computer and home entertainment equipment, disc drives likewise become more prevalent and important components of such electronic systems.

In addition to the recording media, a disc drive typically includes a read/write assembly and a spindle motor assembly. The read/write assembly is adapted to transfer data between the disc and an external system, or device, such as a microprocessor. The spindle motor assembly carries the information storage discs and is arranged to rotate the discs.

FIG. 1 is a cross-sectional view of a conventional spindle motor assembly 20 used in disc drives. As depicted, the spindle motor assembly 20 includes a non-rotating spindle flange 22 which may be fastened to a disc drive housing, not shown. A rotatable spindle hub 25 is positioned over the spindle flange 22 and is carried by an elongated rotatable spindle shaft 8 that runs co-axially with the spindle hub 25 and the spindle flange 22. An information storage disc 6 can be positioned over the spindle hub 25. The spindle shaft 8 is attached to a motor 34.

The motor 34 includes a stator assembly (or stator) 36 and a rotor assembly (or rotor) 38. The stator assembly 36 includes a plurality of lamination stacks 40 each having a corresponding coil wrapped thereabout. There are three such coils, which will be designated herein as coils A, B and C, though only coils A and B are specifically shown in FIG. 1. Rotor assembly 38 is attached to spindle shaft 8 by a lower hub 44. The rotor assembly 38 includes a plurality of magnets 50 disposed about the interior surface of a flange 48.

During operation, coils A, B and C are energized with a drive signal which causes electromagnetic fields to develop about the coils. The resulting attraction/repulsion between the electromagnetic fields of the coils A, B, and C and the magnetic fields created by the magnets 50 causes the rotor assembly 38 and the spindle shaft 8 to rotate about an axis 32. While rotating, the rotor assembly 38 causes a back emf signal to be generated in the coils A, B and C due to the movement of the magnets 50 in relation to the coils A, B and C.

The stator 36 can be viewed as having the three coils A, B, and C connected in a "Y" configuration, as shown in FIG. 2, although a larger number of stator coils are usually employed with multiple rotor poles. Typically, in such applications, eight pole motors are used having twelve stator windings and four N-S magnetic sets on the rotor, resulting in four electrical cycles per revolution of the rotor. The stator coils, however, can be analyzed in terms of three "Y" connected coils, connected in three sets of four coils, each physically separated by 90°.

The coils are energized in sequences to produce a current path through two coils of the "Y", with the third coil left floating, hereinafter floating coil FC. The sequences are arranged so that as the current paths are changed, or commutated, one of the coils of the current path is switched to float, and the previously floating coil is switched into the current path. The sequences are defined such that when the floating coil is switched into the current path, the direction of the current in the coil which was included in the prior current path is not changed. In this manner, six commutation sequences, or phases, are defined for each electrical cycle in a three phase motor, as shown in Table A.

TABLE A

| Phase | Current flows From: | To: | Floating Coil |
|---|---|---|---|
| 1 | A | B | C |
| 2 | A | C | B |
| 3 | B | C | A |
| 4 | B | A | C |
| 5 | C | A | B |
| 6 | C | B | A |

FIG. 3 shows a typical architecture of the motor 34 and a driver circuit 10 for driving the motor 34. Individual elements shown in FIG. 3 are suitably made in accordance with prior practice, as described in detail in U.S. Pat. Nos. 5,317,243 and 5,294,877 which are fully incorporated into this specification by reference. Specifically, the motor 34 consists of the stator 36 driven by the driver circuit 10. Although the driver circuit 10 can be constructed of discrete components, preferably, the driver circuit 10 is integrated onto a single semiconductor chip adapted for connection to the stator coils 26a, 26b, and 26c of a three phase dc brushless spindle motor. The stator coils 26a, 26b, and 26c are connected to output nodes OUTA, OUTB, OUTC and CT.

A driving voltage is provided to the stator coils 26a, 26b, and 26c by a power stage 11, which is configured to have one high side driver HSA, HSB, and HSC (not shown) and one low side driver LSA, LSB, and LSC (not shown) for each of the stator coils 26a, 26b, and 26c. The power stage 11 is sequenced to provide sequential control output signals to the stator coils 26a, 26b, and 26c by a sequencer circuit 13. A signal interface circuit 12 supplies the output signals from the sequencer circuit 13 to the power stage 11, as well as enabling other functions, such as brake and output enable functions. The sequencer circuit 13 also provides drive signals to other circuits of the driver circuit 10 through sequence decode and output switches 15 to control the various aspects of rotation of the motor 34.

The stator coils 26a, 26b, and 26c are switchably connected to a back emf amplifier 14. The back emf amplifier 14 in turn delivers signals to a zero crossing detector 16, which provides input signals to a digital timing circuit 17. The output of a delay counter of the digital timing circuit 17 controls the operation of the sequencer circuit 13.

The driver circuit 10 includes system clock circuitry 23, phase lock loop (PLL) frequency/phase detector circuitry 24, a PWM drive 18 to support pulse width modulation operation mode of the motor, and may include various other circuitry, not shown, such as "align and go" start up circuitry to facilitate start up of the motor from a stopped condition, port control logic and associated shift register circuitry to facilitate control of the driver circuit 10 by an external microprocessor (not shown), and so forth.

One end of each of the stator coils 26a, 26b, and 26c is connected to a common center tap 28. The other end of each stator coil is connected to an output node, respectively designated OUTA, OUTB, and OUTC in FIG. 3. In operation, during an energized phase, one output node, for example node OUTA, is driven high by one of the high side drivers HSA. One output node, for example node OUTB, is driven low by one of the lower side drivers LSB. The third output node, for example node C, is left floating. This is commonly referred to as the "AB phase". The coils are then switched in a commutation sequence determined by the sequencer circuit 13 in a manner such that in each commutation phase current always flows in two of the three coils, with the third coil floating, and that after switching current will continue to flow, and in the same direction, in one of the two coils in which current was flowing in the previous phase to generate the six phases shown in Table A.

The switching of the driver transistors of the power stage 11 to effect the switching currents for each phase is accomplished by the sequencer circuit 13. The sequencer circuit 13 provides signals to the upper driver outputs and the lower driver outputs to accomplish the switching sequence outlined above in Table A.

The commutation among the stator coils 26a, 26b, and 26c is performed in response to information indicating the specific position of the rotor 38 of the motor 34 in conjunction with circuit information indicating the desired position of the rotor 38. More specifically, the commutation to apply the next drive sequence of Table A is determined in response to a corresponding coil reaching a particular rotational position and its correlation with sequencer information indicating where the motor 34 should be when a commutation is to occur. The determination of the precise rotational location of the rotor 38 is continuously being determined by monitoring the zero crossing voltage in each non-driven, or floating, stator coil. More particularly, as the stator coils 26a, 26b, and 26c are switched during the commutation sequence of the rotor 38, the voltage of the floating coil is monitored by the back emf amplifier 14.

During the operation of such a polyphase dc motor, maintaining a known position of the rotor 38 is an important concern. This can be implemented in various ways. One widely used way, for example, has been to start the motor in a known position, then derive information related to the instantaneous or current position of the rotor 38. Such instantaneous position information can be derived during the commutation process by identifying the floating coil and monitoring its back emf, that is, the emf induced into the coil as it moves through the magnetic field provided by the stator 36.

When the voltage of the floating coil crosses zero (referred to in the art as "a zero crossing"), the position of the rotor 38 is assumed to be known. Upon the occurrence of this event, the commutation sequence is incremented to the next phase, and the process repeated. The assumption that the zero crossing accurately indicates the rotor position is generally true if the motor 34 is functioning properly.

The sequence decode and output switches 15 includes switches connected to the stator coils 26a, 26b and 26c through the output nodes OUTA, OUTB, and OUTC to apply a selected one of the output nodes OUTA, OUTB, or OUTC (particularly the output node of the floating coil FC) to the non-inverting input of a comparator in the back emf amplifier 14. Such a comparator 65 is depicted in FIG. 4. The particular one of the output nodes OUTA, OUTB or OUTC which is applied to the comparator 65 corresponds to whichever of coils 26a, 26b, and 26c is expected to be floating (not the coil which is actually floating). Although the term "floating" is used herein to indicate the coil which is not in the instantaneous current path, the coil does not actually "float", but is connected to a tristate impedance.

The center tap connection CT 28 of the stator is connected to the inverting input of the comparator 65, so that when the voltage on the selected floating coil becomes larger than the center tap voltage, the comparator changes states, representing the zero crossing of the voltage on the selected floating coil. When the voltage on the floating coil becomes smaller than the center tap voltage, the comparator again changes states, representing the zero crossing of the voltage on the selected floating coil. (The voltage on the floating coil is the so-called the back emf of the floating coil.) The comparator 65 is designed to have hysteresis, because the occurrence of a voltage beyond the zero crossing voltage may not last a sufficiently long time to enable the output signal of the comparator 65 to be useful.

Referring again to FIG. 3, the sequence decode and output switches 15 produce a PNSLOPE signal 21 corresponding to an expected negative-to-positive going zero crossing slope. The PNSLOPE signal 21 is derived from the commutation signals of the sequencer circuit 13 and therefore is not the actual slope of the back emf of the floating coil, but represents only the slope of the back emf that is next to produce a zero crossing. The PNSLOPE 21 indicates the direction of the expected zero crossing and is generated from the phase information. The zero crossing having a transition in a specified, expected direction, i.e., either a negative-to-positive going zero crossing transition or a positive-to-negative going zero crossing transition.

When the motor 34 is operating in a linear mode, smoothly varying power is continuously applied to the stator coils 26a, 26b and 26c. This produces a fairly clean back emf signal and is favorable to detecting a zero crossing. However, under certain conditions, such as upon commutation of the drive between coil pairs of the motor, noise occurs that may give an inaccurate signal. To avoid a false zero crossing detection the back emf signal can be masked for a certain period after a commutation.

Reducing the power consumed by the motor has long been a goal in the disc drive industry. One way to significantly reduce the power is to operate the motor 34 in pulse width modulation (PWM) mode. The PWM mode is a nonlinear mode with discontinuities in application of drive current to the stator coils. The power to the coils follows the same overall pattern as in the linear mode but is chopped with alternating segments of on and off time as shown in FIG. 5. The frequency of on-off cycles in a PWM mode can typically vary from 25 kHz to 100 kHz. In a typical on-off cycle, lasting for about 20 microseconds, there may be 14 microseconds of on time followed by 6 microseconds of off time.

The switching in the PWM mode causes switching noise and raises the probability of getting an inaccurate back emf signal. To reduce the possibility of a false back emf detection, the back emf signal is masked. The back emf signal is masked for enough time to reduce noise to reduce the possibility of a false zero cross detection due to noise on the back emf signal. Typically, especially for larger frequencies, the masking is for almost the entire on time of each cycle. The back emf signal is sampled at the end of the on time of each cycle, points S, S', S". The off-time of the cycles is typically too short to mask for long enough to eliminate enough noise that the back emf signal is useable.

Referring again to FIGS. 4 and 5, the sampled back emf signal is compared to the central tap CT to determine if there has been a zero crossing. If the output of the comparator 65 toggles we have a back emf zero crossing sometime in between this sample and the last sample, such as between S' and S". The zero crossing is detected when the back emf is sampled at S". Therefore, there is a delay between the real zero crossing occurrence and when it is detected.

This delay presents a problem because the delay could be large, up to whole period of the PWM frequency. The delay between the occurrence and the detection of the zero crossing is the time when the signal crosses the time axis until right before the turn off, i.e., the transition between the on and off time of the cycle. The lower the frequency the worse it will be. The delay in detecting the zero crossing produces jitter in the motor and disrupts the speed control of the motor, which can cause damage to both the disc, and the head and drive components.

SUMMARY OF THE INVENTION

According to the present invention, there is provided a back electromotive force (emf) reconstruction circuit for reconstructing the back emf on a floating coil of a polyphase direct current (dc) motor in a pulse width modulation (PWM) mode. The circuit includes a first capacitor having a first side coupled to a first power supply voltage and a second side switchably coupled to a floating phase voltage of the floating coil of the motor. A first current source is switchably coupled to the second side of the first capacitor in response to a back emf control signal when in a second logic state and charges the first capacitor. A second current source is switchably coupled to the second side of the first capacitor in response to the back emf control signal when in a second logic state and discharges the first capacitor.

In another embodiment of the present invention, there is provided a driver circuit for a polyphase dc motor capable of operating in a PWM mode. The driver circuit includes a back emf reconstruction circuit for reconstructing the back emf on a floating coil of the motor in the PWM. The back emf reconstruction circuit includes a first capacitor having a first side coupled to a first power supply voltage and a second side switchably coupled to a floating phase voltage of the floating coil of the motor, a first current source that is switchably coupled to the second side of the first capacitor in response to a back emf control signal when in a second logic state for charging the first capacitor, a second current source that is switchably coupled to the second side of the first capacitor in response to the back emf control signal when in a second logic state for discharging the first capacitor, and an output wherein a reconstructed back emf signal is produced at the output. The driver circuit also includes a floating phase switch coupled to the floating coil of the motor for switchably coupling the floating coil to the back emf reconstruction circuit in response to a sampling control signal. A comparator compares the reconstructed back emf signal with a center tap signal from the motor to determine a zero crossing.

In yet another embodiment of the present invention, there is provided a circuit for detecting the zero crossings of a back emf signal on a floating coil of a polyphase direct current (dc) motor in a pulse width modulation (PWM) mode. The circuit includes circuitry for sampling the back emf signal from the floating coil of the motor at a predetermined rate and for generating a reconstructed back emf signal from the sampled back emf signal, the reconstructed back emf signal substantially resembling the back emf signal. A detection circuit receives a center tap signal from the motor and the reconstructed back emf signal and detects a zero crossing.

In another embodiment of the present invention, there is provided a method of reducing jitter in a polyphase dc motor operating in a pulse width modulation (PWM) mode. The method includes the steps of sampling at a predetermined rate a back emf signal of a floating coil of the motor, producing a reconstructed back emf signal, comparing the reconstructed back emf signal to a center tap signal of the motor to detect a zero crossing, and outputting a pulse when a zero crossing is detected.

BRIEF DESCRIPTION OF THE DRAWINGS

For a more complete understanding of the present invention, and the advantages thereof, reference is made to the following description taken in conjunction with the accompanying drawings, wherein.

DETAILED DESCRIPTION

Figure 1:
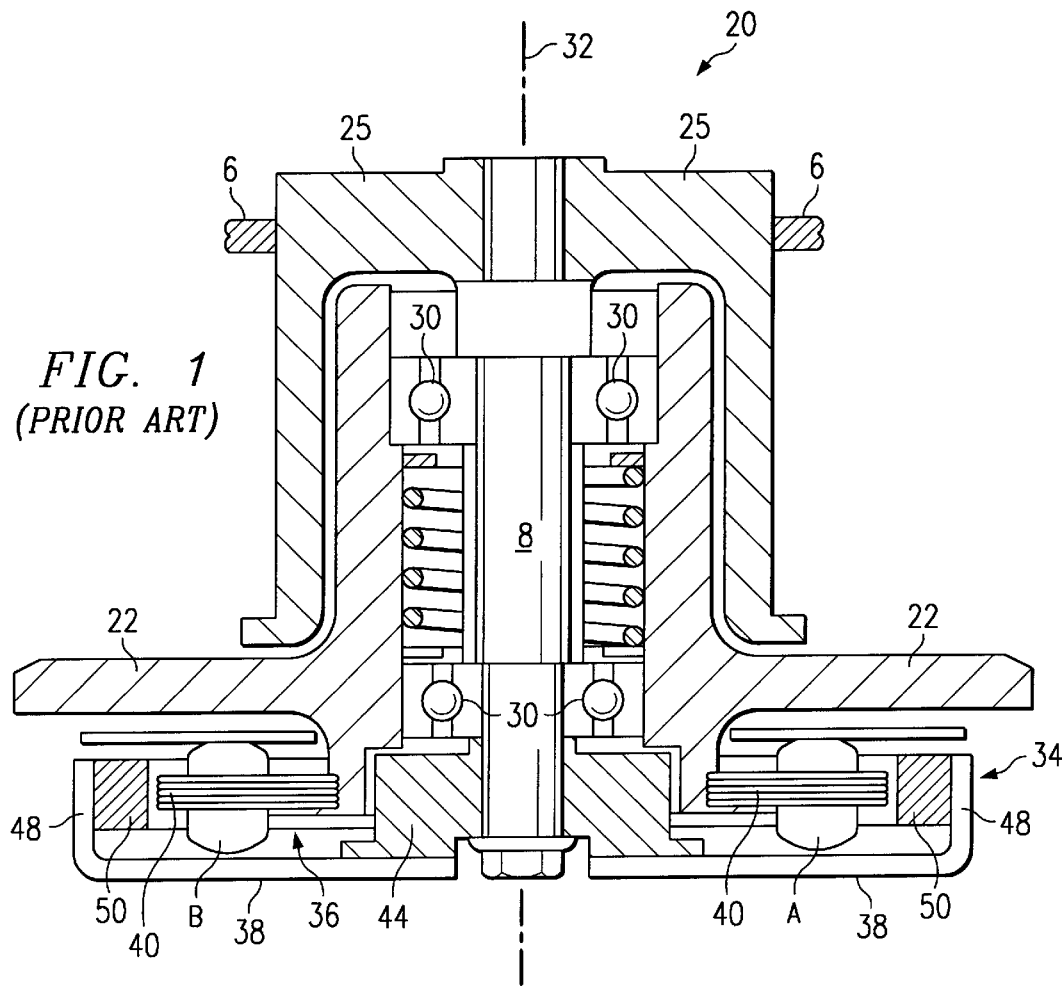
FIG. 1 is a circuit diagram of a spindle motor assembly used in disc drives.
Figure 2:
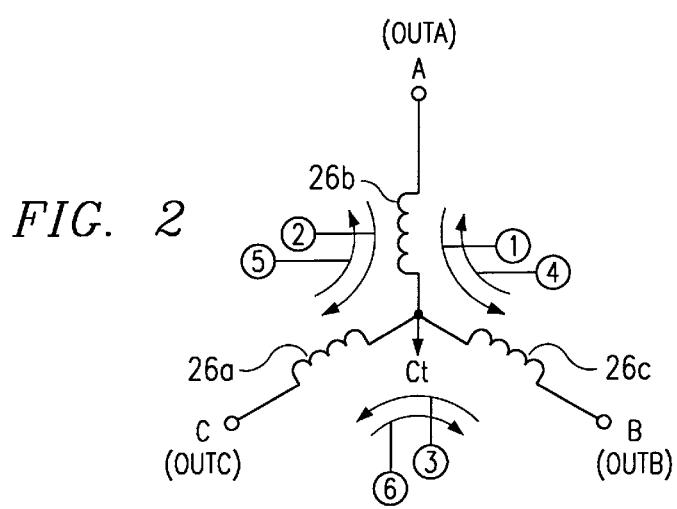
FIG. 2 is a conventional representation of a "Y" configuration coil arrangement.
Figure 3:
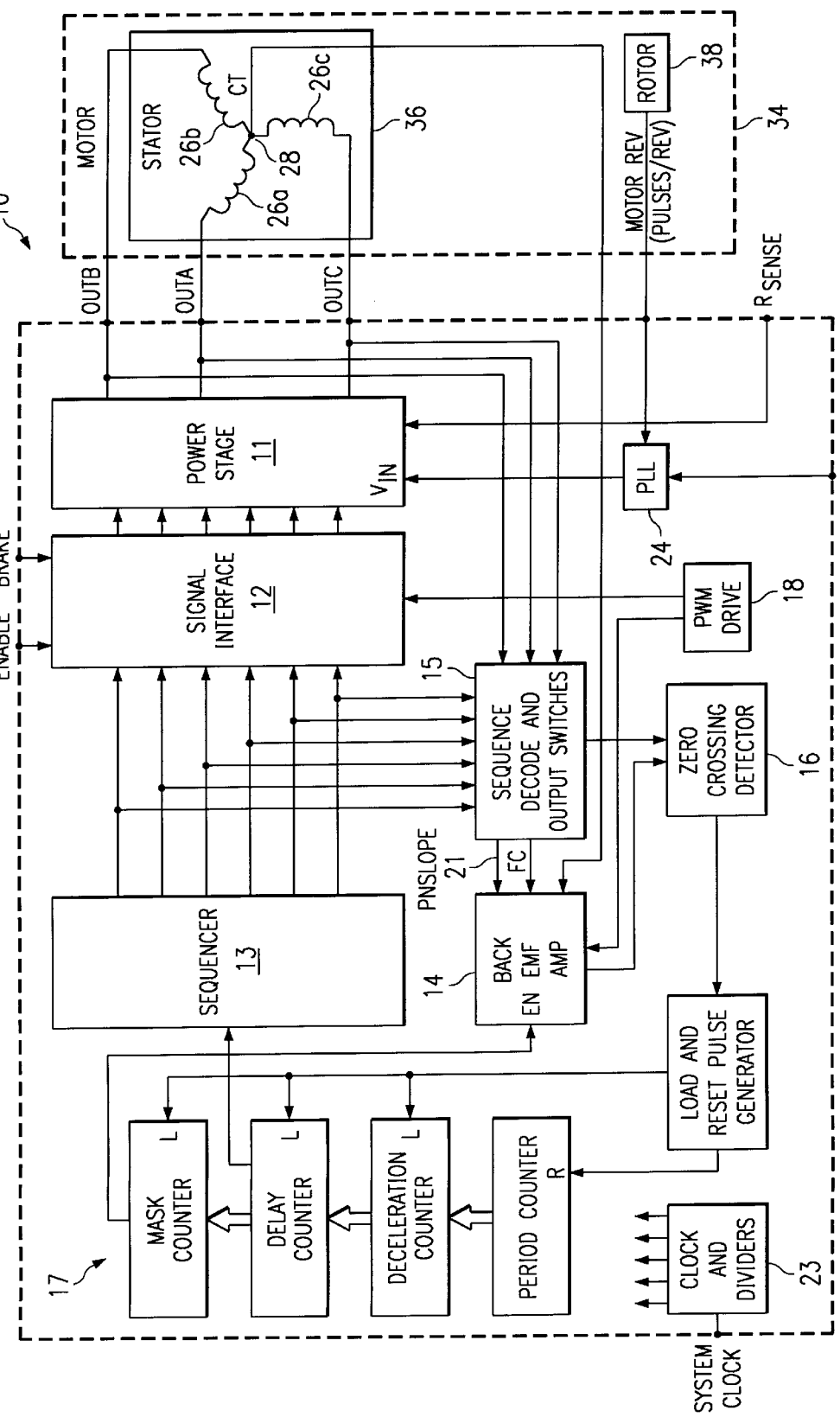
FIG. 3 is a circuit diagram, in block form, of a prior art motor and driver circuit.
Figure 4:
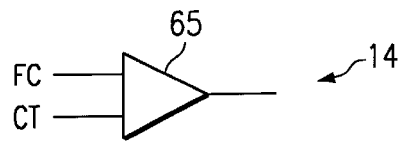
FIG. 4 is a circuit diagram of a conventional back emf amplifier.
Figure 5:
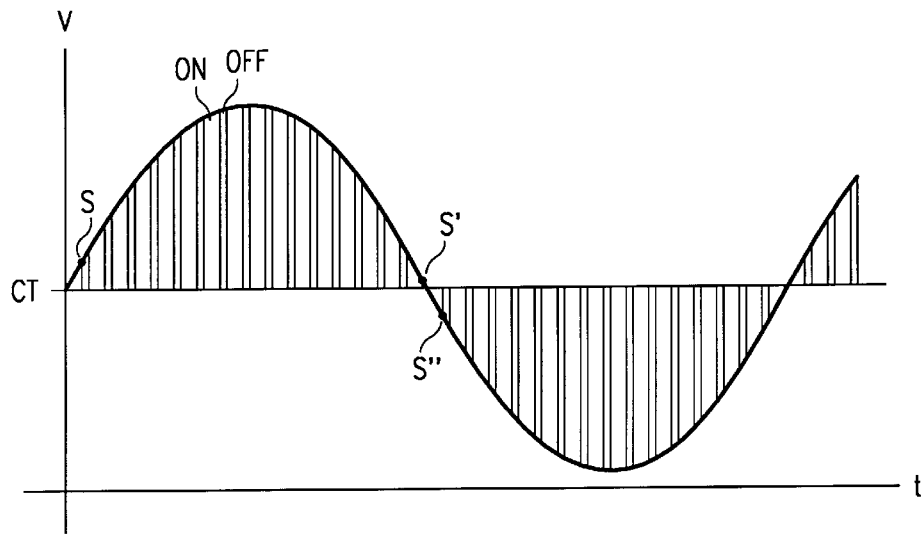
FIG. 5 are waveforms illustrating the back emf signal for the circuit of FIG. 4.
Figure 6:
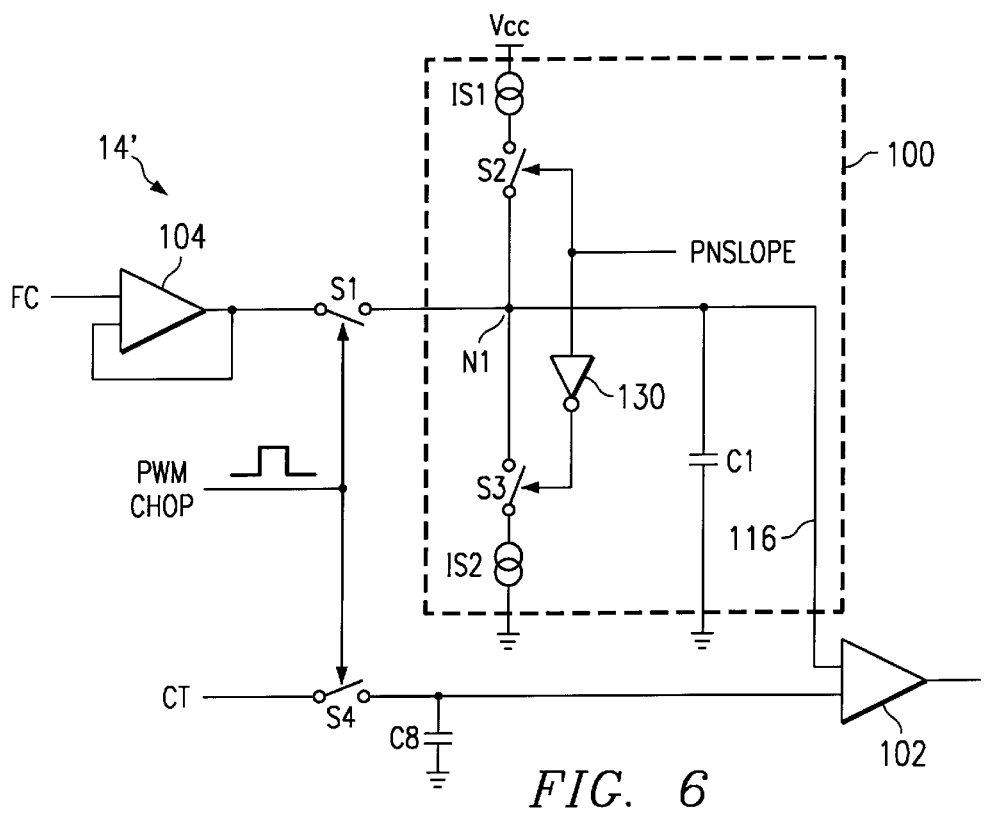
FIG. 6 is a circuit diagram of a back emf amplifier having a back emf reconstruction circuit according to an embodiment of the present invention.
Figure 7:
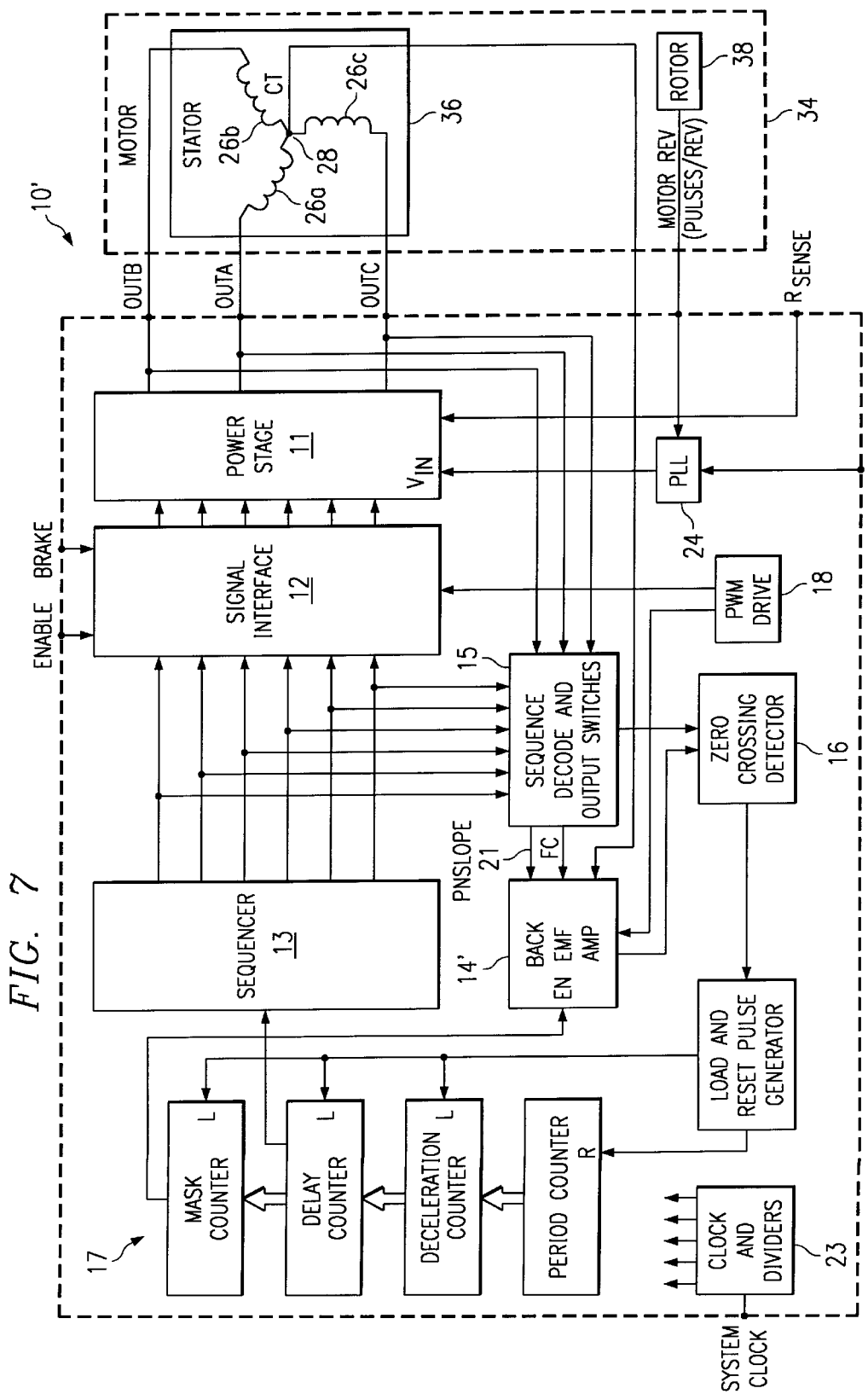
FIG. 7 is a circuit diagram, in block form, of a motor and motor driver circuit having a back emf reconstruction circuit according to an embodiment of the present invention.

Referring to FIG. 6, a back emf reconstruction circuit according to an embodiment of the invention is designated generally by reference numeral 100. The back emf reconstruction circuit 100 is typically included in a back emf amplifier 14' of a motor driver circuit 10' of a polyphase dc motor, as shown in FIG. 7. Parts common to FIGS. 1 through 9 are indicated using the same numbering system.

The driver circuit 10' is like the conventional driver circuit 10 except for the back emf amplifier 14'. The driver circuit 10' preferably is integrated onto a single semiconductor chip adapted for connection to the stator coils 26a, 26b, and 26c of a three phase dc brushless spindle motor 34, although the driver circuit 10' can be constructed of discrete components. The stator coils 26a, 26b, and 26c of the motor 34 are connected to output nodes OUTA, OUTB, OUTC and CT. One end of each of the stator coils 26a, 26b, and 26c is connected to the common center tap CT 28. The other ends are connected to respective output nodes OUTA, OUTB, and OUTC.

A driving voltage is provided to the stator coils 26a, 26b, and 26c by a power stage 11, which is typically configured to have one high side driver HSA, HSB, and HSC (not shown) and one low side driver LSA, LSB, and LSC (not shown) for each of the stator coils 26a, 26b, and 26c. The power stage 11 is sequenced to provide sequential control output signals to the stator coils 26a, 26b, and 26c by a sequencer circuit 13. A signal interface circuit 12 supplies the output signals from the sequencer circuit 13 to the power stage 11, as well as enabling other functions, such as brake and output enable functions. The sequencer circuit 13 also provides drive signals to other circuits of the controller circuitry to control the various aspects of rotation of the motor driven by the driver circuit 10' through sequence decode and output switches 15. The sequence decode and output switches 15 also supply the PNSLOPE to the back emf amplifier 14'. The output node of the floating coil FC, such as output node OUTA when the phase is BC, is coupled to the back emf amplifier 14' through the sequence decode and output switches 15.

The driver circuit 10' includes system clock circuitry 23, phase lock loop (PLL) frequency/phase detector circuitry 24, a PWM drive 18 to support pulse width modulation operation of the motor, and may include various other circuitry, not shown, such as "align and go" start up circuitry to facilitate start up of the motor from a stopped condition, port control logic and associated shift register circuitry to facilitate control of the driver circuit 10' by an external microprocessor (not shown), and so forth.

The switching of the high and low side drivers of the power stage 11 to effect the switching currents for each phase is accomplished by the sequencer circuit 13. The sequencer circuit 13 provides signals to the upper driver outputs and the lower driver outputs to accomplish the switching sequence outlined above in Table A.

The stator coils 26a, 26b, and 26c are switchably connected to a back-emf sense amplifier 14', through output nodes OUTA, OUTB, and OUTC. The back emf amplifier 14' delivers signals to the zero crossing detector 16, which provides input signals to a digital timing circuit 17. The output of the delay counter of the digital timing circuit 17 controls the operation of the sequencer circuit 13.

The PWM drive 18 controls the power stage 11 to produce cycles of on-off time, with current supplied to the driven stator coils during the on time of the PWM cycle. The PWM drive 18 also produces a PWM chop signal, supplied to the power stage 11, signaling the start and end of the on and off times of each PWM cycle. The PWM chop signal is also supplied to the back emf amplifier 14'.

Although FIG. 7 shows one embodiment of the driver circuit 10', any conventional driver circuit of a polyphase dc motor 34 that provides the center tap voltage and the PNSLOPE signal to the back emf amplifier 14', and switchably couples the stator windings 26a, 26b and 26c to the back emf amplifier 14' for comparison of the CT and FC signals can be used.

FIG. 6 shows one embodiment of the back emf amplifier 14'. The floating coil FC supplied through the sequence decode and output switches is coupled to node N1 of the back emf reconstruction circuit through a floating phase switch S1 and the buffer 104. The back emf reconstruction circuit 100 includes a capacitor C1 coupled to ground on one side and to node N1 on the other side. The buffer 104 is preferred, but may be omitted because the impedance of the floating coil FC is lower than the impedance of the capacitor C1. Node N1 is also coupled to a first current source IS1 through a first switch S2, and to a second current source IS2 through a second switch S3. The other end of the first current source IS1 is coupled to the power supply Vcc, and other end of the second current source IS2 is coupled to ground.

The first switch S2 and second switch S3 each have a control terminal coupled to the PNSLOPE signal and its logical inversion, respectively. In the preferred embodiment, an inverter 130 is utilized to generate the inversion. In an alternative embodiment, the first switch S2 is constructed using a p-channel transistor and the second switch S3 is constructed using an n-channel transistor. As will be appreciated, any other arrangement may be used that allows the first switch S2 to be closed when PNSLOPE is low and the second switch S3 to be closed when the PNSLOPE is high, allowing the capacitor to charge up through the first current source IS1 when the PNSLOPE is low, and to discharge through the second current source IS2 when the PNSLOPE is high.

The output of the back emf reconstruction circuit 100 is connected to the non-inverting input of the comparator 102. The center tap output node CT is connected to the inverting input of the comparator 102 through the center tap switch S4. The control terminals of the floating phase switch S1 and the center tap switch S4 are coupled to a sampling control signal, the PWM chop signal provided by the PWM drive 18. When the voltage on the floating coil FC changes state with regard to the center tap voltage, the comparator 102 produces an output, representing the zero voltage crossing of the voltage on the floating coil FC. The comparator 102 can be designed to have hysteresis, because the occurrence of a voltage beyond the zero crossing voltage may not last a sufficiently long time to enable the output signal of the comparator 102 to be useful.

Figure 8:
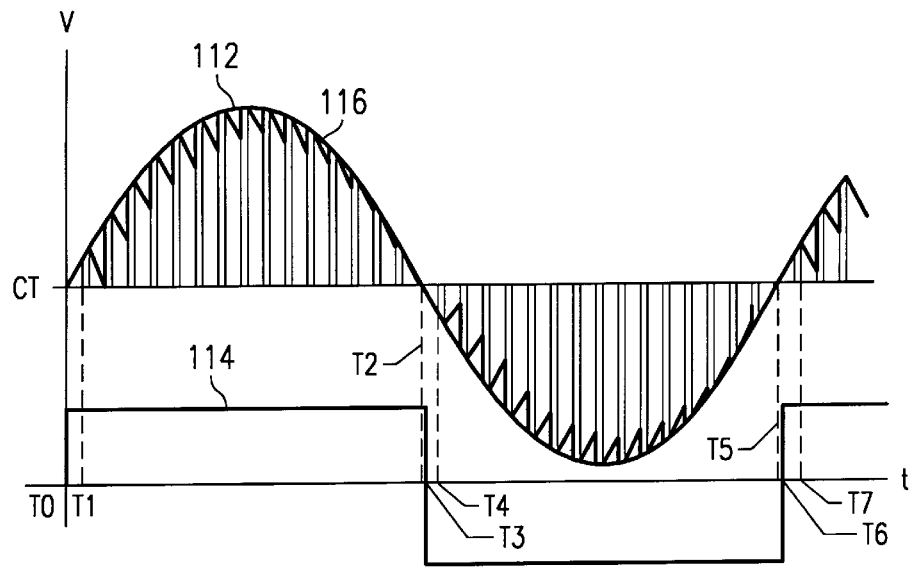
FIG. 8 are waveforms illustrating the back emf signal and the operation of the back emf reconstruction circuit.

Referring to FIG. 6 and FIG. 8 simultaneously, the operation of the invention will now be described. FIG. 8 shows a graph of the signal PNSLOPE 21 (identified by reference numeral 114) and the back emf signal FC (identified by reference numeral 112) of the floating coil FC. The back emf is a fluctuating dc voltage in the shape of a sine wave centered around the center tap voltage.

The PNSLOPE 114 represents the slope of the back emf signal on the floating coil FC. Between T0 and T1 the back emf 112 is above the center tap voltage, making the PNSLOPE high. The first switch S2 is open and the second switch S3 is closed, providing a path from the first capacitor C1 to ground through the second switch S3 and the second current source IS2, discharging the first capacitor C1. At T1, the PWM chop signal signals the end of the on time of the PWM cycle, by generating a pulse. The floating phase switch S1 and the center tap switch S4 both close for the duration of the pulse. The first IS1 and second IS2 current sources are designed so that the current generated from the buffer 104 (or floating coil FC if no buffer is used) is larger than the current of the current sources IS1 and IS2. Because current on the buffer 104 (or floating coil FC) is larger than the current flowing through the second current source IS2, the buffer current charges up the first capacitor C1. At the end of the PWM chop signal pulse the floating phase switch S1 and the center tap switch S4 open. The first capacitor C1 discharges through the second current source IS2 until the next pulse on the PWM chop signal line, indicating the end of the on time of the next PWM cycle when the floating phase switch S1 is closed, recharging the first capacitor C1. This is repeated with each cycle of the PWM mode while the PNSLOPE is high, producing a reconstructed back emf signal, identified by reference numeral 116.

The comparator 102 is continuously comparing the voltage at the output of the back emf reconstruction circuit 100, which is the voltage across the first capacitor C1, to the voltage at the center tap CT. A capacitor C8 coupled to the CT line downstream of the center tap switch S4 (to one of the inputs to the comparator 102) stores the voltage of the CT signal while the switch S4 is open during the PWM off-time.

The capacitance C of the first capacitor C1 is chosen to closely model the back emf curve 112 as it approaches the center tap voltage when the first capacitor C1 is discharging. The capacitance should be:

$$C = \frac{I * t}{V}$$

where the I is the current discharging through the second current source IS2, t is the time the capacitor is discharging and V is the change in voltage across the first capacitor C1. When the back emf is approaching a zero crossing, the change in voltage across the first capacitor C1 with respect to the change in time is the slew rate.

At T2, the voltage of the reconstructed back emf signal 116 is less than the center tap voltage CT. The comparator changes states, representing the zero crossing of the voltage on the floating coil. The actual zero crossing occurs substantially at T2. Without the back emf reconstruction circuit 100 the zero crossing would not have been detected until the end of the next on time at T4, and reconstructing the back emf allows the zero crossing to be detected much sooner, reducing any jitter produced by the delayed detection of a zero crossing.

At T3, the voltage of the back emf signal 112 is below the center tap CT voltage, and with a zero crossing detected, the PNSLOPE signal goes low. As will be appreciated, the time period between T2 and T3 (when the zero-crossing is detected and the PNSLOPE signal goes low) is relatively small, and in some designs, may be longer due to an added delay.

When the PNSLOPE signal goes low, the first switch S2 closes and the second switch S3 opens, providing a path from the first capacitor C1 to the power supply voltage Vcc through the first switch S2 and the first current source IS1, charging the first capacitor C1. At T4, the PWM chop signal generates a pulse to signal the end of the on time of a PWM cycle. The floating phase switch S1 and the center tap switch S4 both close for the duration of the pulse. The current generated from the buffer is larger than the current flowing through the first current source IS1, and brings the voltage on the first capacitor C1 to the voltage level of the back emf signal 112 on the floating coil FC. At the end of the PWM chop signal pulse, the floating phase switch S1 and the center tap switch S4 open. The first capacitor C1 charges up through the first current source IS1 until the next pulse of the PWM chop signal indicates the end of the on time of the next PWM cycle. At this time the floating phase switch S1 is closed, bringing the voltage of the first capacitor C1 back to the voltage of the floating coil FC. This is repeated with each cycle of the PWM mode while the PNSLOPE is low, producing the reconstructed back emf signal 116.

The comparator 102 is still continuously comparing the voltage at the output of the back emf reconstruction circuit 100, which is the voltage across the first capacitor C1, to the voltage at the center tap CT. When conducting, the current generated by the first current source IS1 is substantially the same as the current generated by the second current source IS2. Therefore the same capacitance C, chosen as described above, should closely model the voltage of the first capacitor C1 as it is charging through the first current source IS1.

At T5, the voltage of the reconstructed back emf signal 116 becomes larger than the center tap voltage CT. The comparator changes states, representing the zero crossing of the voltage on the floating coil FC. The actual zero crossing occurs substantially at T5. Without the back emf reconstruction circuit 100 the zero crossing would not have been detected until the end of the next on time at T7, and reconstructing the back emf allows the zero crossing to be detected much sooner, reducing any jitter produced by the delayed detection of a zero crossing.

As an alternative to the foregoing embodiment the first capacitor C1 can be an external capacitor. Locating the first capacitor C1 externally to the back emf reconstruction circuit 100 allows one to change the capacitance of the first capacitor when the driver circuit 10' is connected to a different motor, having a different center tap voltage. Allowing the driver circuit 10' to be moved to many different motors and still closely model the back emf curve of the floating coil when the back emf approaches the center tap voltage, allows the driver circuit 10' to more accurately detect zero crossings while providing it with the flexibility to be used with different motors.

Figure 9:
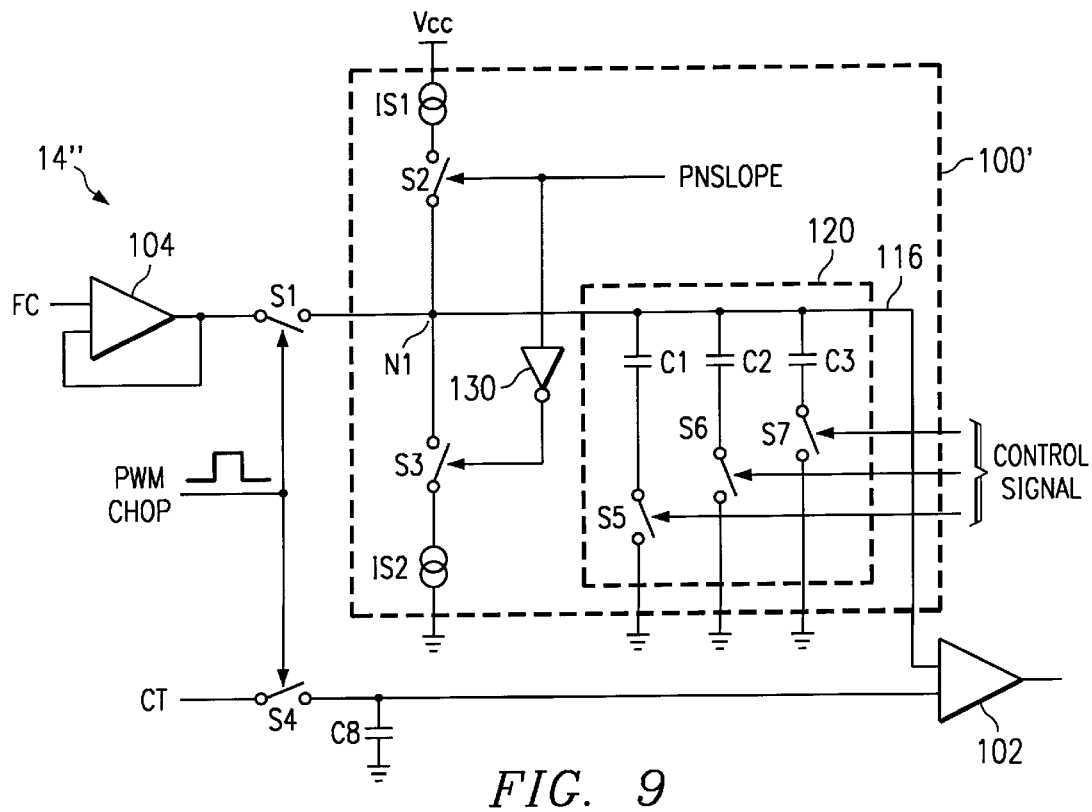
FIG. 9 is a circuit diagram of a back emf amplifier having a back emf reconstruction circuit according to another embodiment of the present invention.

In another alternative to the foregoing embodiment, the first capacitor can be replaced with the modeling circuit 120 shown in FIG. 9. The modeling circuit 120 contains a first capacitor switch S5 connected to ground. The first capacitor switch S5 connects the first capacitor C1 to ground when closed and disconnects the first capacitor from rest of the circuit when open. A second capacitor C2 is connected between node N1 and a second capacitor switch S6. The first S5 and second S6 capacitor switches can be used to produce the capacitance shown in Table B.

TABLE B

| 1st Capacitor Switch | 2nd Capacitor Switch | Capacitance |
| --- | --- | --- |
| closed | open | C1 |
| closed | closed | C1‖C2 |
| open | closed | C2 |
| open | open | 0 |

The switches can operate so that either the first capacitor C1 or the second capacitor C2 can be used in the circuit, or that the two capacitors can be used in parallel in the circuit.

Being able to change the capacitance of the modeling circuit 120 allows the back emf reconstruction circuit 100' to be tailored to model the back emf curve of the floating coil of the motor that the back emf reconstruction circuit 100' is coupled to, as the back emf curve approaches the center tap voltage. Other capacitors and switches, such as C3 and S7 can be added to allow further flexibility.

A slope control signal at the control terminal of the capacitor switches controls the state of the capacitor switches S5, S6, S7. The capacitor switches can be controlled in any known way to allow the capacitors to be connected and disconnected to the rest of the circuit. For example, the switches can be hard wired, permitting the device to be mass produced and then modified when it is attached to a motor. Alternatively, the control of the capacitor switches can be connected to a register, i.e., memory (not shown) that produces control signals (see FIG. 9) for controlling the capacitor switches. For example, a two-bit register would be needed for two switches. The bit register can be programmed through an interface (such as a serial port interface to change the capacitive value which can be used) to accommodate different motor 15, or even different speed of the same motor. Allowing the driver circuit 10' to be moved to several different motors and still closely model the back emf curve of the floating coil when the back emf approaches the center tap voltage, allows the driver circuit 10' to more accurately detect zero crossings. This is accomplished without the added cost of adding an external component and with minimal reconfiguration.

Referring again to FIG. 6, reconstructing the back emf allows the zero crossing to be determined at or very close to the actual zero crossing. This reduces any jitter that can be produced by the delayed detection of a zero crossing. Using several capacitors and programmable switches to change the value of the capacitance allows the back emf reconstruction circuits 100 and 100' to be able to model the voltage on the floating phase of several motors. This permits the same back emf reconstruction circuit to be used in different motors and still reconstruct the back emf to allow the zero crossing to be determined at or very close to the actual zero crossing.

It should be noted that although a preferred embodiment of the invention is described with regard to a three phase motor, in particular, the principles of the invention can be equally advantageously applied to polyphase motors, in general.

Although the invention has been specifically described with reference to several preferred and alternative embodiments, it will be understood by those skilled in the art having reference to the current specification and drawings that various modifications may be made and further alternatives are possible without departing from the spirit and scope of the invention as set forth in the appended claims.

What is claimed is:

1. A back electromotive force (emf) reconstruction circuit for reconstructing the back emf on a floating coil of a polyphase direct current (dc) motor in a pulse width modulation (PWM) mode, the back emf reconstruction circuit comprising:

a first capacitor having a first side coupled to a first power supply voltage and a second side switchably coupled to a floating phase voltage of the floating coil of the motor;

a first current source switchably coupled to the second side of the first capacitor in response to a back emf control signal when in a second logic state and for charging the first capacitor; and a second current source switchably coupled to the second side of the first capacitor in response to the back emf control signal when in a second logic state and for discharging the first capacitor.

2. The circuit in accordance with claim 1 further comprising:

a second capacitor having a second side coupled to the second side of the first capacitor;

a first capacitor switch for switchably coupling the first side of the first capacitor to the first power supply voltage; and a second capacitor switch for switchably coupling a first side of the second capacitor to the first power supply voltage.

3. The circuit in accordance with claim 2 further comprising:

a third capacitor having a second side coupled to the second side of the first capacitor; and a third capacitor switch for switchably coupling a first side of the third capacitor to the first power supply voltage.

4. The circuit in accordance with claim 2 further comprising a memory for producing a control signal to control the first and second capacitor switches.

5. The circuit in accordance with claim 1 further comprising a floating phase switch coupled to the floating coil of the motor for switchably coupling the floating coil to second side of the first capacitor in response to a sampling control signal.

6. The circuit in accordance with claim 1 wherein the first current source is switchably coupled to the first capacitor through a p-channel transistor and the second current source is switchably coupled to the first capacitor through an n-channel transistor.

7. The circuit in accordance with claim 1 further comprising a buffer.

8. The circuit in accordance with claim 1 wherein the back emf control signal comprises a PNSLOPE signal.

9. A driver circuit for a polyphase dc motor capable of operating in a PWM mode comprising:

a back emf reconstruction circuit for reconstructing the back emf on a floating coil of the motor in the PWM, the back emf reconstruction circuit comprising:

a first capacitor having a first side coupled to a first power supply voltage and a second side switchably coupled to a floating phase voltage of the floating coil of the motor, a first current source switchably coupled to the second side of the first capacitor in response to a back emf control signal when in a second logic state and for charging the first capacitor, a second current source switchably coupled to the second side of the first capacitor in response to the back emf control signal when in a second logic state and for discharging the first capacitor, and an output wherein a reconstructed back emf signal is produced at the output;

a floating phase switch coupled to the floating coil of the motor for switchably coupling the floating coil to the back emf reconstruction circuit in response to a sampling control signal; and a comparator for comparing the reconstructed back emf signal with a center tap signal from the motor to determine a zero crossing.

10. The driver circuit in accordance with claim 9 wherein the back emf reconstruction circuit further comprises:

a second capacitor having a second side coupled to the second side of the first capacitor;

a first capacitor switch for switchably coupling the first side of the first capacitor to the first power supply voltage; and a second capacitor switch for switchably coupling a first side of the second capacitor to the first power supply voltage.

11. The driver circuit in accordance with claim 10 wherein the back emf reconstruction circuit further comprises:

a third capacitor having a second side coupled to the second side of the first capacitor; and a third capacitor switch for switchably coupling a first side of the third capacitor to the first power supply voltage.

12. The driver circuit in accordance with claim 9 wherein the sampling control signal is generated from a PWM signal.

13. The driver circuit in accordance with claim 9 wherein the first current source is switchably coupled to the first capacitor through a p-channel transistor and the second current source is switchably coupled to the first capacitor through an n-channel transistor.

14. The driver circuit in accordance with claim 9 wherein the back emf control signal comprises a PNSLOPE signal.

15. A disc drive comprising:
 a polyphase dc motor capable of operating in a PWM mode;
 a driver circuit for the motor comprising:
  a first capacitor having a first side coupled to a first power supply voltage and a second side switchably coupled to a floating phase voltage of the floating coil of the motor,
  a first current source switchably coupled to the second side of the first capacitor in response to a back emf control signal when in a second logic state and for charging the first capacitor, and
  a second current source switchably coupled to the second side of the first capacitor in response to the back emf control signal when in a second logic state and for discharging the first capacitor, and
  an output wherein a reconstructed back emf signal is produced at the output; and
 a comparator for comparing the reconstructed back emf signal with a center tap signal from the motor to determine a zero crossing.

16. The disc drive in accordance with claim 15 wherein the back emf reconstruction circuit further comprises:
 a second capacitor having a second side coupled to the second side of the first capacitor;
 a first capacitor switch for switchably coupling the first side of the first capacitor to the first power supply voltage; and
 a second capacitor switch for switchably coupling a first side of the second capacitor to the first power supply voltage.

17. The disc drive in accordance with claim 15 wherein the first current source is switchably coupled to the first capacitor through a p-channel transistor and the second current source is switchably coupled to the first capacitor through an n-channel transistor.

18. A circuit for detecting the zero crossings of a back emf signal on a floating coil of a polyphase direct current (dc) motor in a pulse width modulation (PWM) mode, the circuit comprising:
 means for sampling the back emf signal from the floating coil of the motor at a predetermined rate;
 means for generating a reconstructed back emf signal from the sampled back emf signal, the reconstructed back emf signal substantially resembling the back emf signal; and
 a detection circuit receiving a center tap signal from the motor and the reconstructed back emf signal and for detecting a zero crossing.

19. The circuit in accordance with claim 18 wherein the slope of the reconstructed back emf signal is substantially the same as the slope of the back emf signal around the zero crossing.

20. The circuit in accordance with claim 18 wherein the sampling rate is determined in response to the PWM mode.

21. The circuit in accordance with claim 18 wherein the means for reconstructing comprises a capacitive element for storing a voltage level substantially equal to the back emf signal during the sampling of the back emf signal.

22. The circuit in accordance with claim 21 wherein the means for reconstructing further comprises:
 a first current source for discharging the capacitive element during a time period when the back emf signal is not sampled in response to a control signal when in a first logic state; and
 a second current source for charging the capacitive element during a time period when the back emf signal is not being sampled in response to the control signal when in a second logic state, and wherein the capacitive element outputs the reconstructed back emf signal.

23. The circuit in accordance with claim 21 wherein the capacitive element has a capacitance such that the reconstructed back emf signal substantially models the slew rate of the back emf signal proximate a zero crossing.

24. A method of reducing jitter in a polyphase dc motor operating in a pulse width modulation (PWM) mode, comprising the steps of:
 sampling at a predetermined rate a back emf signal of a floating coil of the motor;
 producing a reconstructed back emf signal by charging a first side of a capacitor to a voltage level substantially the same as the sampled back emf signal;
 comparing the reconstructed back emf signal to a center tap signal of the motor to detect a zero crossing; and
 outputting a pulse when a zero crossing is detected.

25. A method in accordance with claim 24 wherein the step of sampling occurs during the off-time of the PWM mode.

26. A method in accordance with claim 24 wherein the step of producing a reconstructed back emf signal further comprises the step of discharging the capacitor at a predetermined rate.

27. A method in accordance with claim 26 wherein the step of discharging occurs during the on-time of the PWM mode.

28. A method in accordance with claim 26 wherein the step of discharging the capacitor at a predetermined rate uses a current source.

29. A method of reducing jitter in a polyphase dc motor operating in a pulse width modulation (PWM) mode, comprising the steps of:
 sampling at a predetermined rate a back emf signal of a floating coil of the motor;
 producing a reconstructed back emf signal by discharging a first side of a capacitor to a voltage level substantially the same as the sampled back emf signal;
 comparing the reconstructed back emf signal to a center tap signal of the motor to detect a zero crossing; and
 outputting a pulse when a zero crossing is detected.

30. A method in accordance with claim 29 wherein the step of sampling occurs during the off-time of the PWM mode.

31. A method in accordance with claim 29 wherein the step of producing a reconstructed back emf signal further comprises the step of charging the capacitor at a predetermined rate.

32. A method in accordance with claim 31 wherein the step of charging occurs during the on-time of the PWM mode.

33. A method in accordance with claim 31 wherein the step of charging the capacitor at a predetermined rate uses a current source.

34. A method of reducing jitter in a polyphase dc motor operating in a pulse width modulation (PWM) mode, comprising the steps of:
 sampling at a predetermined rate a back emf signal of a floating coil of the motor;
 producing a reconstructed back emf signal;

comparing the reconstructed back emf signal to a center tap signal of the motor to detect a zero crossing; and outputting a pulse when a zero crossing is detected.

35. A method in accordance with claim 34 wherein the step of producing the reconstructed back emf signal comprises the steps of:

charging a first side of a capacitor to a voltage level substantially the same as the sampled back emf signal in response to a control signal when in a first logic state; and discharging the first side of the capacitor to a voltage substantially the same as the sampled back emf signal in response to the control signal when in a second logic state.

36. A method in accordance with claim 35 wherein the step of sampling occurs during the off-time of the PWM mode.

37. A method in accordance with claim 36 wherein the steps of charging a first side of a capacitor to a voltage level substantially the same as the sampled back emf signal in response to a control signal when in a first logic state, and discharging the first side of the capacitor to a voltage substantially the same as the sampled back emf signal in response to the control signal when in a second logic state, occurs during the off-time of the PWM mode.

38. A method in accordance with claim 35 wherein the step of producing the reconstructed back emf signal further comprises the steps of:

discharging the first side of the capacitor at a predetermined rate in response to the control signal when in the first logic state; and charging the first side of the capacitor at a predetermined rate in response to the control signal when in the second logic state.

39. A method in accordance with claim 38 wherein the steps of discharging the first side of the capacitor at a predetermined rate in response to the control signal when in the first logic state, and charging the first side of the capacitor at a predetermined rate in response to the control signal when in the second logic state, occurs during the on-time of the PWM mode.

40. A method in accordance with claim 35 wherein the step of discharging the capacitor at a predetermined rate uses a first current source and the step of charging the capacitor at a predetermined rate uses a second current source.

41. A method of reconstructing the back emf of a floating coil of a polyphase dc motor operating in PWM mode, comprising the steps of:

responsive to the back emf control signal being at a first logic state:

coupling a first capacitor to a second current source, coupling the first capacitor to the floating coil responsive to a sampling control signal, charging the first capacitor, decoupling the first capacitor from the floating coil responsive to the end of the sampling control signal, and discharging the first capacitor; and responsive to the back emf control signal being at a second logic state:

coupling a first capacitor to a first current source, coupling the first capacitor to the floating coil responsive to the sampling control signal, discharging the first capacitor, decoupling the first capacitor from the floating coil responsive to the end of the sampling control signal, and charging the first capacitor.

42. The method in accordance with claim 41 wherein the back emf control signal comprises a PNSLOPE signal.

43. The method in accordance with claim 41 wherein the sampling control signal comprises a pulse of a PWM chop signal.

44. The method in accordance with claim 41 wherein the step of coupling the first capacitor to the second current source comprises the step of closing a second switch having a control terminal for receiving the back emf control signal and one side coupled to the second current source and another side coupled to the first capacitor; and the step of coupling the first capacitor to the first current source comprises the step of closing a first switch having a control terminal for receiving the back emf control signal and one side coupled to first current source and another side coupled to the first capacitor.

45. The method in accordance with claim 41 further comprising the steps of:

decoupling the first capacitor from the first current source responsive to the back emf control signal being at the first logic state; and decoupling the first capacitor from the second current source responsive to the back emf control signal being at the second logic state.

46. The method in accordance with claim 45 wherein the step of coupling the first capacitor to the second current source and the step of decoupling the first capacitor from the first current source occur concurrently.

47. The method in accordance with claim 45 wherein the step of coupling the first capacitor to the first current source and the step of decoupling the first capacitor from the second current source occur concurrently.

* * * * *